(12) United States Patent
Aldea Lopez

(10) Patent No.: US 11,687,763 B2
(45) Date of Patent: Jun. 27, 2023

(54) METHOD, APPARATUS AND COMPUTER PROGRAM TO CARRY OUT A TRAINING PROCEDURE IN A CONVOLUTIONAL NEURAL NETWORK

(71) Applicant: FUJITSU LIMITED, Kawasaki (JP)

(72) Inventor: Sergio Aldea Lopez, London (GB)

(73) Assignee: FUJITSU LIMITED, Kawasaki (JP)

( * ) Notice: Subject to any disclaimer, the term of this patent is extended or adjusted under 35 U.S.C. 154(b) by 831 days.

(21) Appl. No.: 16/600,002

(22) Filed: Oct. 11, 2019

(65) Prior Publication Data

US 2020/0125933 A1 Apr. 23, 2020

(30) Foreign Application Priority Data

Oct. 19, 2018 (EP) ..................................... 18201443

(51) Int. Cl.
*G06F 9/50* (2006.01)
*G06T 1/20* (2006.01)
*G06N 3/063* (2023.01)

(52) U.S. Cl.
CPC ........... *G06N 3/063* (2013.01); *G06F 9/5027* (2013.01); *G06T 1/20* (2013.01)

(58) Field of Classification Search
CPC ........ G06N 3/063; G06N 3/084; G06N 5/046; G06N 20/00; G06N 3/0454; G06F 9/5027; G06T 1/20
See application file for complete search history.

(56) References Cited

U.S. PATENT DOCUMENTS 9,646,243 B1 5/2017 Gokmen
2007/0179927 A1* 8/2007 Vaidyanathan ........ G06V 10/94
(Continued)

FOREIGN PATENT DOCUMENTS

CN 105224502 A 1/2016
WO WO 2015/003436 A1 1/2015

OTHER PUBLICATIONS

Y. Jia et al.; "*Caffe:Convolutional Architecture for Fast Feature Embedding*"; arXiv preprint arXiv: 1408.5093, 2014. (4 pages).
(Continued)

*Primary Examiner* — Jorge A Chu Joy-Davila
(74) *Attorney, Agent, or Firm* — Staas & Halsey LLP

(57) ABSTRACT

A computer-implemented method in a computing network of a number of processing nodes 1 to X, in the computing network neurons of a Convolutional Neural Network (CNN) are divided between the number of nodes. The method including allocating a mini-batch of input data from among mini-batches of input data to a node of the nodes; splitting the mini-batch into a number of mini-batch sections X corresponding and equal to the number of nodes; at the node retaining a mini-batch section which has a same number as the node and sending other mini-batch sections of the split mini-batch sections to corresponding other nodes according to a number of the split mini-batch sections; collating at the node the split mini-batch sections at the node into a single matrix and multiplying the collated matrix by the neurons to provide output data sections having one section of output data per each mini-batch. At the node sending the output data sections corresponding to the other corresponding nodes to the corresponding nodes and combining the output data sections in the node so that the node has output data for entire of the split mini-batch sections.

13 Claims, 14 Drawing Sheets

(56) References Cited

U.S. PATENT DOCUMENTS

| | | | |
|---|---|---|---|
| 2014/0229763 A1* | 8/2014 | Lou | G06F 11/2094 714/6.23 |
| 2016/0171974 A1 | 6/2016 | Hannun et al. | |
| 2017/0148433 A1 | 5/2017 | Catanzaro et al. | |
| 2018/0032865 A1* | 2/2018 | Nishimura | G06N 3/045 |
| 2018/0039884 A1* | 2/2018 | Dalton | G06N 3/04 |
| 2019/0042527 A1* | 2/2019 | Langer | G06F 9/5061 |
| 2019/0129888 A1* | 5/2019 | Bowman | G06F 3/0604 |
| 2020/0162538 A1* | 5/2020 | Sui | G06F 11/1658 |

OTHER PUBLICATIONS

M. Abadi et al.; "*Large-Scale Machine Learning on Heterogeneous Distributed Systems*"; Nov. 9, 2015. (19 pages).

S. Tokui et al; "*Chainer: a Next-Generation Open Source Framework for Deep Learning*"; in proceedings of Workshop on Machine Learning Systems (LearningSys) in the Twenty-ninth Annual Conference on Neural Information Processing Systems (MIPS), 2015. (6 pages).

T. Chen et al.; "*MXNet: A Flexible and Efficient Machine Learning Library for Heterogeneous Distributed Systems*"; in Neural Information Processing Systems, Workshop on Machine Learning Systems, Dec. 3, 2015. (6 pages).

A. Krizhevsky, "*One weird trick for parallelizing convolutional neural networks*"; CoRR, No. abs/1404.5997, Apr. 29, 2014. (7 pages).

Y. Zou et al.; "*Mariana: Tencent deep learning platform and its applications*"; Proceedings of the VLDB Endowment, vol. 7, No. 13, pp. 1772-1777, 2014. (6 pages).

P.D.O. Castro et al.; "*CERE: LLVM-based Codelet Extractor and REplayer for piecewise benchmarking and optimization*"; ACM Transactions on Architecture and Code Optimization (TACO), vol. 12, No. 1, Apr. 2015. (26 pages).

Dean et al.; "*Large scale distributed deep networks*"; In advances in neural information processing systems (pp. 1223-1231). (11 pages).

Coates et al.; "Deep learning with COTS HPC systems"; In proceedings of the 30$^{th}$ International Conference on Machine Learning (ICML-13) (pp. 1337-1345) (9 pages).

Yadan et al.; "*Multi-gpu training of convnets*"; arXiv preprint arXiv:1312.5853, 9.; Feb. 18, 2014; (4 pages).

Wang et al.; "*Deep Learning at Scale and at Ease*"; Arxiv.org, Mar. 22, 2016 (23 pages).

Extended European Search Report dated Apr. 25, 2019 in corresponding European Patent Application No. 18201443.1 (11 pages).

* cited by examiner

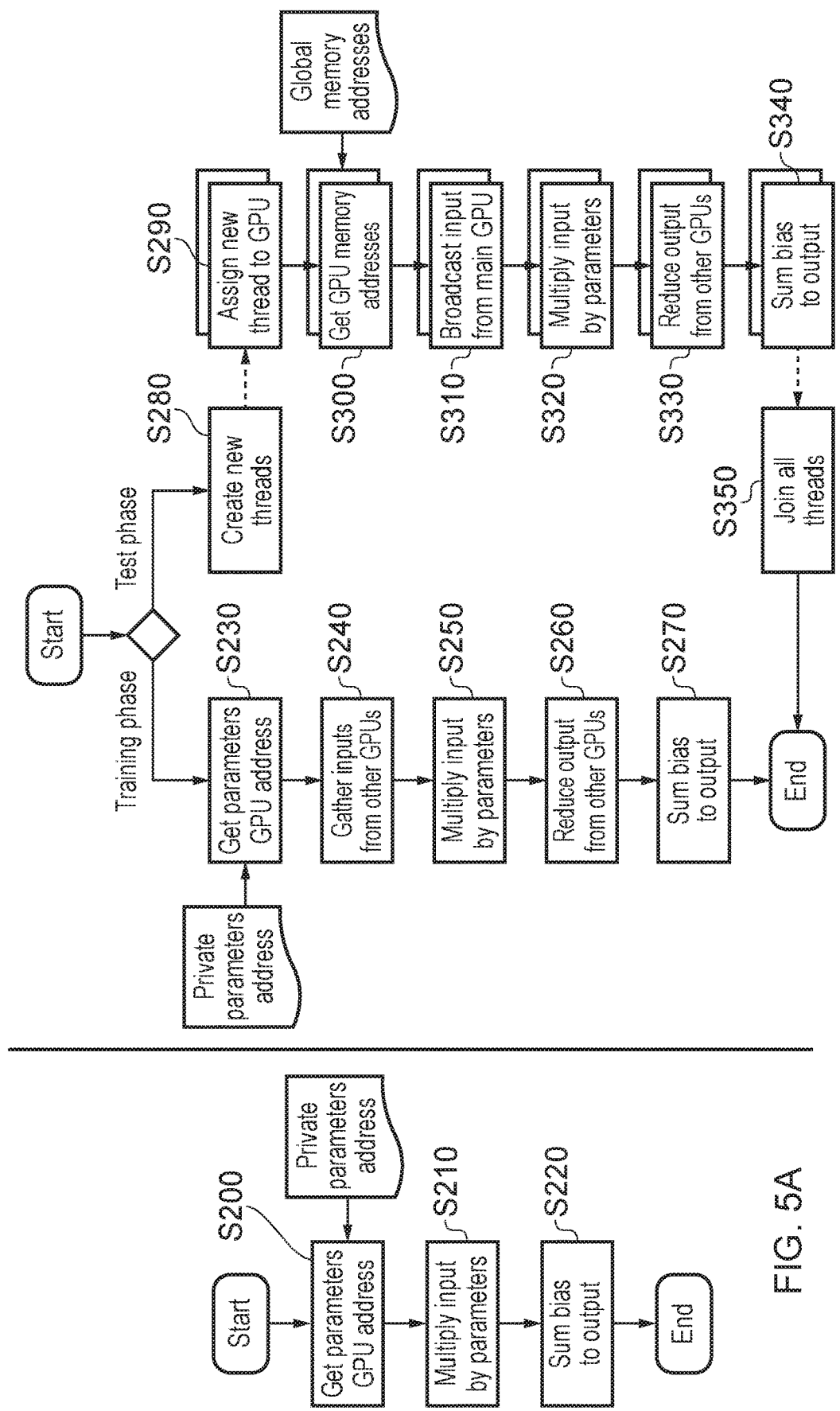

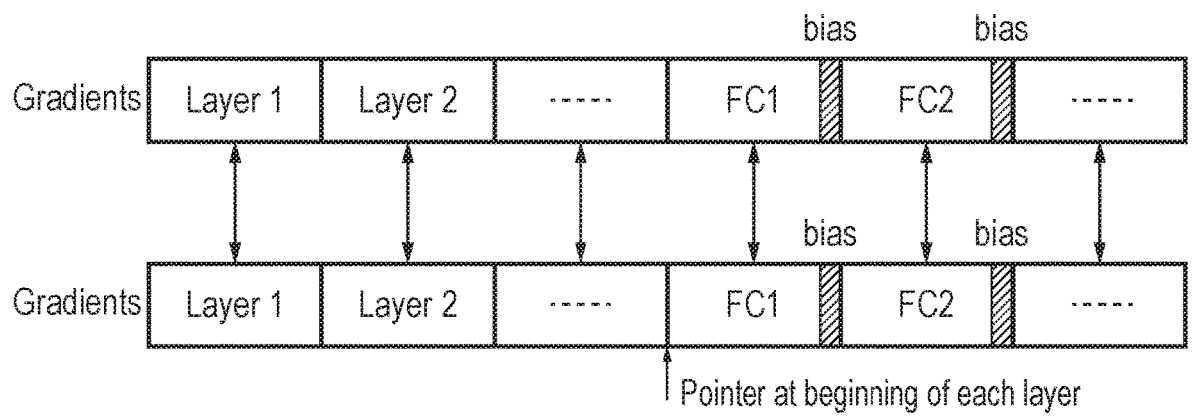
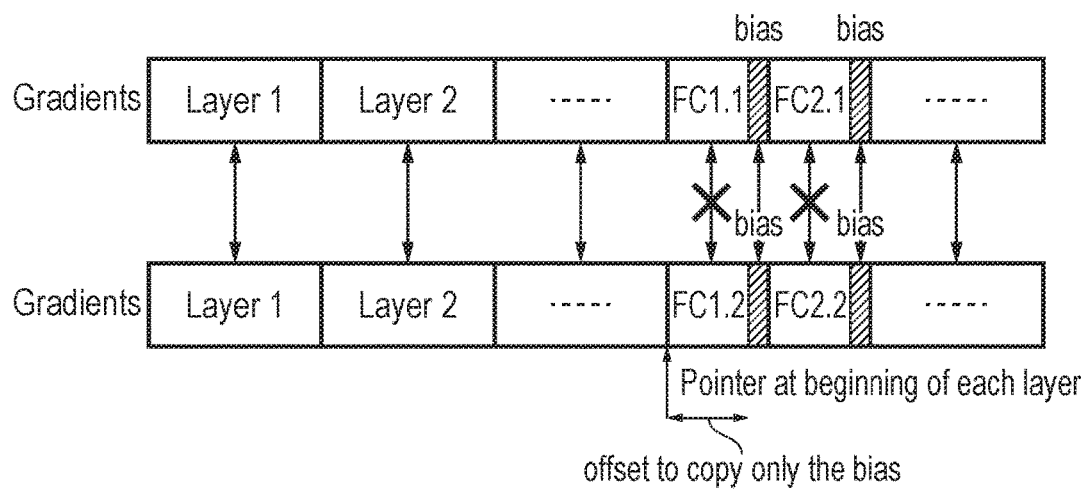
FIG. 10

METHOD, APPARATUS AND COMPUTER PROGRAM TO CARRY OUT A TRAINING PROCEDURE IN A CONVOLUTIONAL NEURAL NETWORK

CROSS-REFERENCE TO RELATED APPLICATIONS

This application is based on and hereby claims priority to European Patent Application No. 18201443.1, filed Oct. 19, 2018, in the European Patent Office, the entire content of which is incorporated herein by reference.

FIELD

Embodiments of the present invention relate to a method and apparatus which distribute memory requirements of deep neural networks in training.

BACKGROUND

Computational units in an artificial neural network (ANN) are modelled after neurons in the human brain, the neurons in the ANN being grouped by layers. Typically there is an input layer of neurons, an output layer of neurons, and hidden layers of neurons, for example convolution, pooling, rectified linear units, fully connected layers, etc. A Deep Neural Network (DNN) is an ANN with multiple hidden layers of neurons acting as computational units between input and output layers. Each computational unit combines different data inputs, which are weighted, to compute a function, sometimes referred to as an activation function or transfer function. This function could be a linear combination of the weighted inputs, or something more elaborate such as a sigmoid function.

A convolutional layer is used for feature extraction. It can be viewed as a set of one or more weighted filters or neurons which slide (or convolve) across an array of input data multiplying the input data by the filter values. These multiplications are then summed at each location of the filter, so the output is likely to be smaller in dimension than the input. The output of a first convolutional layer becomes the input of the next convolutional layer. A Fully Connected or FC layer is used for feature classification. It takes output data from a previous layer and determines which features belong to a particular class (labelling the output data).

When training an ANN, the outputs of the network are compared with a desired output using a loss function and an error value is calculated for each neuron in the output layer. The error values are then back-propagated until each neuron in the network has an error value. These error values are used to calculate the gradients of the loss function with respect to the weights in the network, the gradients in turn being used to update the weights in order to minimise the loss function.

DNNs offer the potential to achieve significant advancements in speech and image recognition, with accuracy performance exceeding those recorded by other sophisticated methods in Machine Learning. However, the training process of DNNs is an extremely computationally intensive task, which typically requires large computational resources, including memory (RAM) and training (execution) time. To address the long training times, several efforts have focused on improvements to speed up deep learning algorithms while exploiting the computational power of both specialised and mainstream hardware accelerators, including, for example, Graphics Processing Units, GPUs, Intel® Xeon Phi™, FPGA, ASICs, etc. (the terms GPU, accelerator and node are used interchangeably in this document). However, these accelerators have memory restrictions, as they usually include a limited amount of in-device memory. Such limitation poses a problem when the DNN to be trained requires more memory than the available memory within an accelerator. In other words, the weights (also referred to as parameters—w) and the data (sometimes referred to as activations) required to train the DNN do not fit into the accelerator's memory, and the process responsible for the training process cannot perform immediately.

To address the large memory requirements, several distribution schemes have been proposed with focus on using more than one accelerator. To this end, several schemes have been reported that deal with distributing the memory or computational requirements of DNNs. For instance, when all memory requirements for representing a DNN can be stored in the memory of one accelerator; a distribution of the training data into a number of batches is typically used. Each GPU may receive a subset of the batch, known as a mini-batch. Effectively, in the data-distribution approach, the entire network's model (neurons with their weights, functions and gradients) is replicated and stored on all accelerators. All accelerators compute the gradients based on their local input (training) data and a local copy of the weights. They then exchange weight gradient values, in a synchronous or asynchronous fashion, in order to update the weights across all accelerators. In this approach, only the input data is evenly distributed into mini-batches across the devices. While data-distribution works well for relatively small DNN models, i.e. those that can be stored in the memory of one accelerator, one can easily conclude that this approach can impose a serious limitation on the size of DNNs that can be efficiently trained. Another limitation associated with memory availability on accelerators is that the training of DNNs can be limited to the relatively small batch sizes of the input (training) data.

To address the memory limitation imposed by data-distribution, the distribution can be applied across the model dimension of the DNN instead, so that different parts of the DNN model are stored and therefore trained on different accelerators. This means that whenever a model's part requires access to data that belong to another part of the DNN model, the two parts must exchange data. While existing approaches for model-distribution can provide a mechanism for distributing some of the memory requirements of DNNs, they do not automate the process to allow distribution of weights and corresponding gradients, nor do they automatically take care of identifying the neurons whose states must be exchanged between the now distributed parts of the network. Instead, a user needs to be aware of how the neurons and corresponding weights are linked between the distributed layers. Subsequently, a user needs to decide how to assign each sub-set of weights and gradients to which part of the distribution and therefore the corresponding neurons that must be exchanged.

In the prior art, a model-parallelism training process with distributed parameters is either not provided (see Caffe—Y. Jia, E. Shelhamer, J. Donahue, S. Karayev, J. Long, R. Girshick, S. Guadarrama and T. Darrell, "Caffe: Convolutional Architecture for Fast Feature Embedding," arXiv preprint arXiv:1408.5093, 2014), it has to be manually defined (see Tensorflow—M. Abadi, A. Agarwal and P. Barham, "Large-Scale Machine Learning on Heterogeneous Distributed Systems," 2015Chainer), or the actual distribution is not achieved by splitting a particular layer, but by placing different layers at different accelerators (see MxNet—T. Chen, M. Li, Y. Li, M. Lin, N. Wang, M. Wang, T. Xiao, B. Xu, C. Zhang and Z. Zhang, "MXNet: A Flexible and Efficient Machine Learning Library for Heterogeneous Distributed Systems," in Neural Information Processing Systems, Workshop on Machine Learning Systems, 2015.). As a result, practical implementation of model parallelisation in prior art frameworks is limited or non-existing.

Alex Krizhevsky proposed different schemes for the combination of data and model parallelisation in A. Krizhevsky, "One weird trick for parallelizing convolutional neural networks," CoRR, no. abs/1404.5997, 2014. In summary, Krizhevsky proposes that convolutional layers use data parallelism, with each worker (computational resource) training the same convolutional layers on a different training data batch, and that the fully connected layers use model parallelism, with all workers training on the same batch and communicating as frequently as the network allows.

An illustration of part of a neural network process according to Krizhevsky is shown in FIG. 1. This scheme uses data and model parallelism. Three batches, b0, b1 and b2 in matrix form are input to GPU #0, GPU #1 and GPU #2 respectively as bottom data (input data). The batches are of uniform height and of length K, which corresponds to the number of neurons in the previous layer. Each GPUs splits the batch that it receives into three sections K/3 (or mini-batches, one per GPU), retains its own section and distributes the other two sections to the other two GPUs, so that the left section of each batch is processed by GPU #0, the central section is processed by GPU #1 and the end section is processed by GPU #2.

For example, GPU #0 retains the left section bottom data of b0, receives the left section bottom data of b1 from GPU #1 and receives the left section bottom data of b2 from GPU #2. Correspondingly, it transfers the central and right sections of the batch b0 bottom data that it receives to GPU #1 and GPU #2 respectively.

GPU #0 then processes the left section of all three batches in turn, by multiplication with the subset of K/3 by N neurons allocated to that GPU giving an output format of the same previous height by a length of N. GPU #0 then transfers the output data (top data) for the b1 and b2 left sections back to GPU #1 and GPU #2 respectively and retains the output data (top data) for the b0 left section. GPU #0 receives the top data for the b0 central section and right section from GPU #1 and GPU #2 respectively to combine all the top data for b0 for processing in the fully connected layer using model parallelism.

The same communication structure applies analogously to GPU #1 and GPU #2, with GPU #1 processing the central section of bottom data and combining all the top data for b1, and GPU #2 processing the end section of bottom data and combining all the top data for b2.

Hence, this process takes a different mini-batch at a time, each from a different GPU, and calculates the output by performing a small matrix-matrix multiplication. Different neurons work on different parts of the data.

FIG. 1 highlights an important bottleneck in the communications throughout the training process of the neural network. Performance of Krizhevsky's approach is restricted by several factors:

(1) Multiple small matrix multiplications at the fully connected layers that do not efficiently exploit the underlying hardware, namely accelerators (GPUs are largely used in this domain);

(2) Although communications aim to overlap computation at the fully connected layers, this trade-off vanishes when the network has an excessively large number of parameters, and therefore the number of activations to be communicated is very large, while the matrix-matrix multiplications are suboptimal (very rectangular matrices which are much larger in one direction); and (3) The distribution of parameters does not take into account the different size of dimensions of the matrix representing them, which leads to further inefficiencies. Other studies that implement similar schemes, such as Zou—Y. Zou, X. Jin, Y. L, Z. G. E. Wang and B. Xiao, "Mariana: Tencent deep learning platform and its applications," Proceedings of the VLDB Endowment, vol. 7, no. 13, pp. 1772-1777, 2014, show lower performance when combining data and model parallelism in comparison with data-only parallelism.

SUMMARY

According to an embodiment of a first aspect of the invention, there is provided a computer-implemented method comprising: in a computing network comprising a plurality of X nodes having processors and memory, dividing neurons of a Convolutional Neural Network, CNN, between the nodes 1 to X; allocating a mini-batch of input data to each of the nodes; splitting the mini-batches into a number of sections X corresponding and equal to the number of nodes; at each node retaining the section of the mini-batch which has the same number as the node and sending the other sections of the mini-batch to their corresponding nodes; collating the mini-batch sections at each node into a single matrix and multiplying the collated matrix by the neurons at that node to provide output data having one section of output data per mini-batch; at each node sending the output data sections corresponding to the other nodes back to the corresponding nodes and combining the output data in each node so that each node has output data for its entire mini-batch.

Embodiments of the invention provide a method to combine data and model parallelism in Deep Neural Networks (DNNs) in a more efficient manner, by integrating multiple mini-batches into the underlying GPU or accelerator, reducing the amount of necessary multiplications, and making such multiplications more efficient from the perspective of the underlying GPU or accelerator. Embodiments also significantly reduce the amount of communication needed to synchronise the parameters of the DNN, which is usually the main bottleneck of data-only parallel solutions. By modifying the logic of how the distributed layers of a DNN are processed, embodiments simplify the communication patterns while improving the layer performance.

The data-model approach of embodiments may benefit the current developments of libraries for processor chips. Many chips only offer a data-only parallel solution, and cannot reap the benefits that model parallelism brings, essentially, faster training of DNNs with higher resolution images. Moreover embodiments are not limited to on-premises hardware, but are extensible to cloud solutions and the impact of embodiments may improve the performance of multiple AI/ML (Artificial Intelligence/Machine Learning) services and products.

The method may be used in a forward propagation phase, in a convolution layer or a fully connected layer of the CNN, for training the CNN.

Each node may include memory and processing capability, and is preferably an accelerator, such as a GPU.

The method can be enhanced as required. For example the method may include adding a bias term to the combined output data.

The method may further comprise, in a forward propagation test phase at a fully connected layer, creating new threads from a root solver thread at a main node executing a test iteration, each new thread assigned to a different node, the new threads accessing memory addresses of neuron parameters held at other nodes.

The main node may broadcast input data for the test phase to the new threads, and the threads may then compute the output of the layer before all the threads are joined.

In a backward propagation phase at a convolutional layer, each node may receive input data gradients for its mini-batch and send the input data gradients to each node where a section of the mini-batch was processed; and each node may multiply the input data gradients at the node with the collated mini-batches from a forward propagation phase to produce parameter gradients at each node from all the mini-batches.

The input data gradients may be stored at each node in the space used for the output data for the entire mini-batch.

The method may further comprise using backward propagation to calculate data gradients, wherein each node multiples the output data for the entire mini-batch by the parameter gradients to provide output data gradients; and the output data gradients corresponding to the other nodes are sent back to the corresponding nodes so that each node holds the data gradients for its entire mini-batch.

Only the bias maybe synchronised at a fully connected layer before the parameters are updated, without further synchronisation being used or required.

The CNN may be a Deep Neural Network (DNN).

According to an embodiment of an apparatus aspect of the invention, there is provided an apparatus to carry out a training procedure of a Convolutional Neural Network, CNN, comprising: one or more processing nodes; and memory having instructions stored thereon, the instructions when executed by the one or more nodes, causing the nodes to control operations comprising: dividing neurons of the CNN between a plurality of nodes 1 to X; allocating a mini-batch of input data to each of the nodes; splitting the mini-batches into a number of sections X corresponding and equal to the number of nodes; retaining at each node the section of the mini-batch which has the same number as the node and sending the other sections of the mini-batch to their corresponding nodes; collating the mini-batch sections at each node into a single matrix and multiplying the collated matrix by the neurons at that node to provide output data having one section of output data per mini-batch; and at each node sending the output data sections corresponding to the other nodes back to the corresponding nodes and combining the output data in each node so that each node has output data for its entire mini-batch in its memory.

According to an embodiment of a software aspect of the invention, there is provided a computer program which when executed by one or more processors, causes the processors to perform operations comprising: dividing neurons of a Convolutional Neural Network, CNN, between a plurality of nodes 1 to X; allocating a mini-batch of input data to each of the nodes; splitting the mini-batches into a number of sections X corresponding and equal to the number of nodes; at each node retaining the section of the mini-batch which has the same number as the node and sending the other sections of the mini-batch to their corresponding nodes; collating the mini-batch sections at each node into a single matrix and multiplying the collated matrix by the neurons at that node to provide output data having one section of output data per mini-batch; at each node sending the output data sections corresponding to the other nodes back to the corresponding nodes and combining the output data in each node so that each node has output data for its entire mini-batch.

An apparatus or computer program according to preferred embodiments of the present invention may comprise any combination of the method aspects. Methods or computer programs according to further embodiments may be described as computer-implemented in that they require processing and memory capability.

The apparatus according to preferred embodiments is described as configured or arranged to, or simply "to" carry out certain functions. This configuration or arrangement could be by use of hardware or middleware or any other suitable system. In preferred embodiments, the configuration or arrangement is by software.

Thus according to one aspect there is provided a program which, when loaded onto at least one computer configures the computer to become the apparatus according to any of the preceding apparatus definitions or any combination thereof.

According to a further aspect there is provided a program which when loaded onto the at least one computer configures the at least one computer to carry out the method steps according to any of the preceding method definitions or any combination thereof.

In general the computer may comprise the elements listed as being configured or arranged to provide the functions defined. For example this computer may include memory, processing, and a network interface.

The invention may be implemented in digital electronic circuitry, or in computer hardware, firmware, software, or in combinations of them. The invention may be implemented as a computer program or computer program product, i.e., a computer program tangibly embodied in a non-transitory information carrier, e.g., in a machine-readable storage device, or in a propagated signal, for execution by, or to control the operation of, one or more hardware modules.

A computer program may be in the form of a stand-alone program, a computer program portion or more than one computer program and may be written in any form of programming language, including compiled or interpreted languages, and it may be deployed in any form, including as a stand-alone program or as a module, component, subroutine, or other unit suitable for use in a data processing environment. A computer program may be deployed to be executed on one module or on multiple modules at one site or distributed across multiple sites and interconnected by a communication network.

Method steps of the invention may be performed by one or more programmable processors executing a computer program to perform functions of the invention by operating on input data and generating output. Apparatus of the invention may be implemented as programmed hardware or as special purpose logic circuitry, including e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions coupled to one or more memory devices for storing instructions and data.

The invention is described in terms of particular embodiments. Other embodiments are within the scope of the following claims. For example, the steps of the invention may be performed in a different order and still achieve desirable results.

Elements of the invention have been described using the terms "processor" and "memory". The skilled person will appreciate that such functional terms and their equivalents may refer to parts of the system that are spatially separate but combine to serve the function defined. Equally, the same physical parts of the system may provide two or more of the functions defined.

For example, separately defined means may be implemented using the same memory and/or processor as appropriate.

BRIEF DESCRIPTION OF DRAWINGS

Preferred features of the present invention will now be described, purely by way of example, with references to the accompanying drawings, in which:

FIG. 5A is a flow chart of traditional execution flow of the forward propagation of a fully connected layer in a DNN;

FIG. 5B is a flow chart of the execution flow in the data-model approach;

FIG. 10 is a schematic diagram of synchronisation requirements in the data-parallel implementation versus the data-model approach;

DETAILED DESCRIPTION OF EMBODIMENTS

Invention embodiments provide a new efficient method of combining data and model parallelism for training DNNs, which reduces the overall memory footprint of the DNN, and increases its training performance, especially when the number of parameters/weights at the fully connected layers is significantly large.

Figure 1:
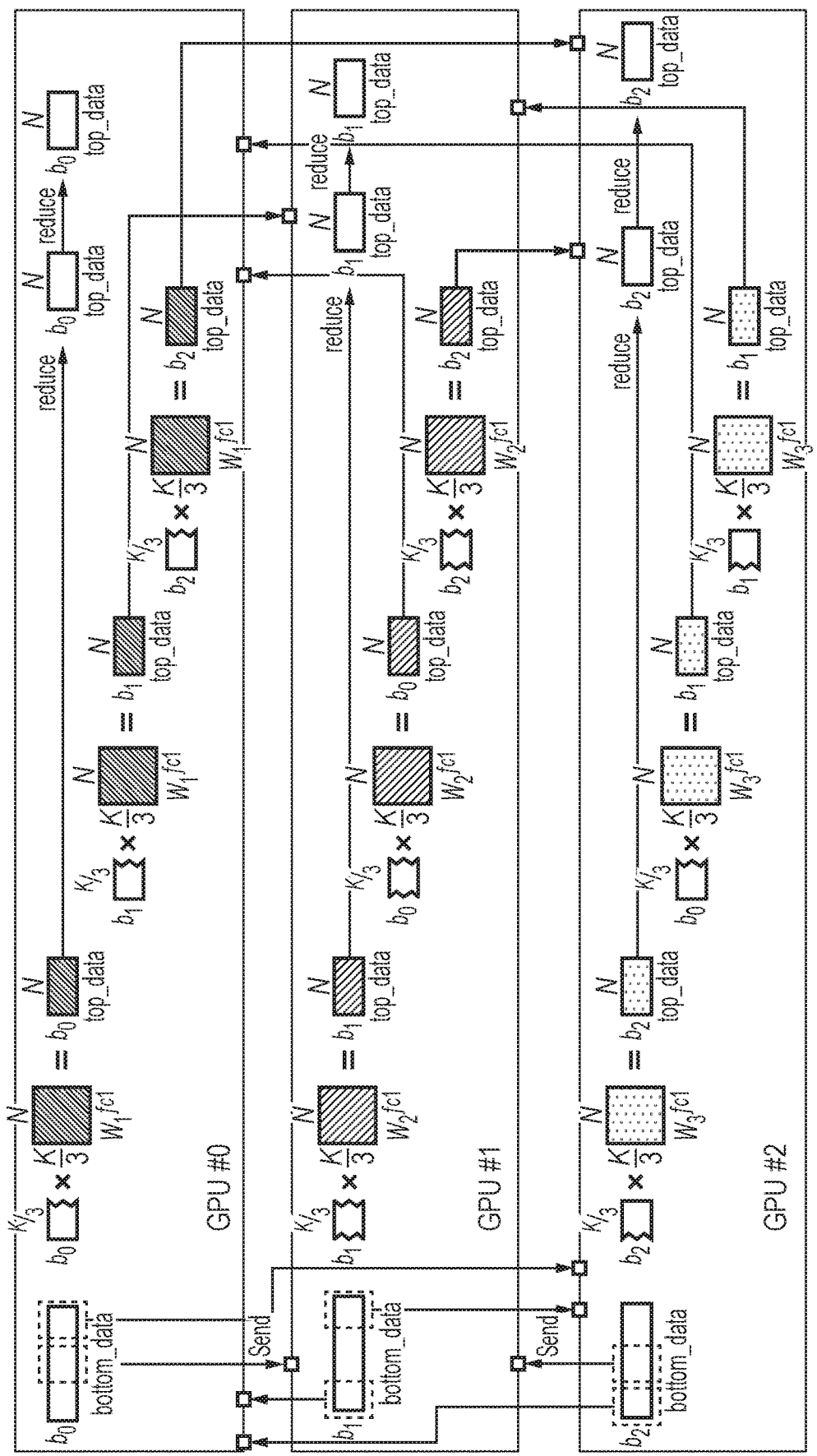
FIG. 1 is a schematic diagram of data and model parallelism across 3 GPUs in forward propagation of a DNN according to a prior art approach.

This approach taken in embodiments avoids staggering the multiple matrix-matrix multiplications involved in the Krizhevsky data-model parallelism approach, as shown in FIG. 1, by changing the inner process of the layers so that each GPU computes the outputs corresponding to all mini-batches at any given point at the same time.

Figure 2A:
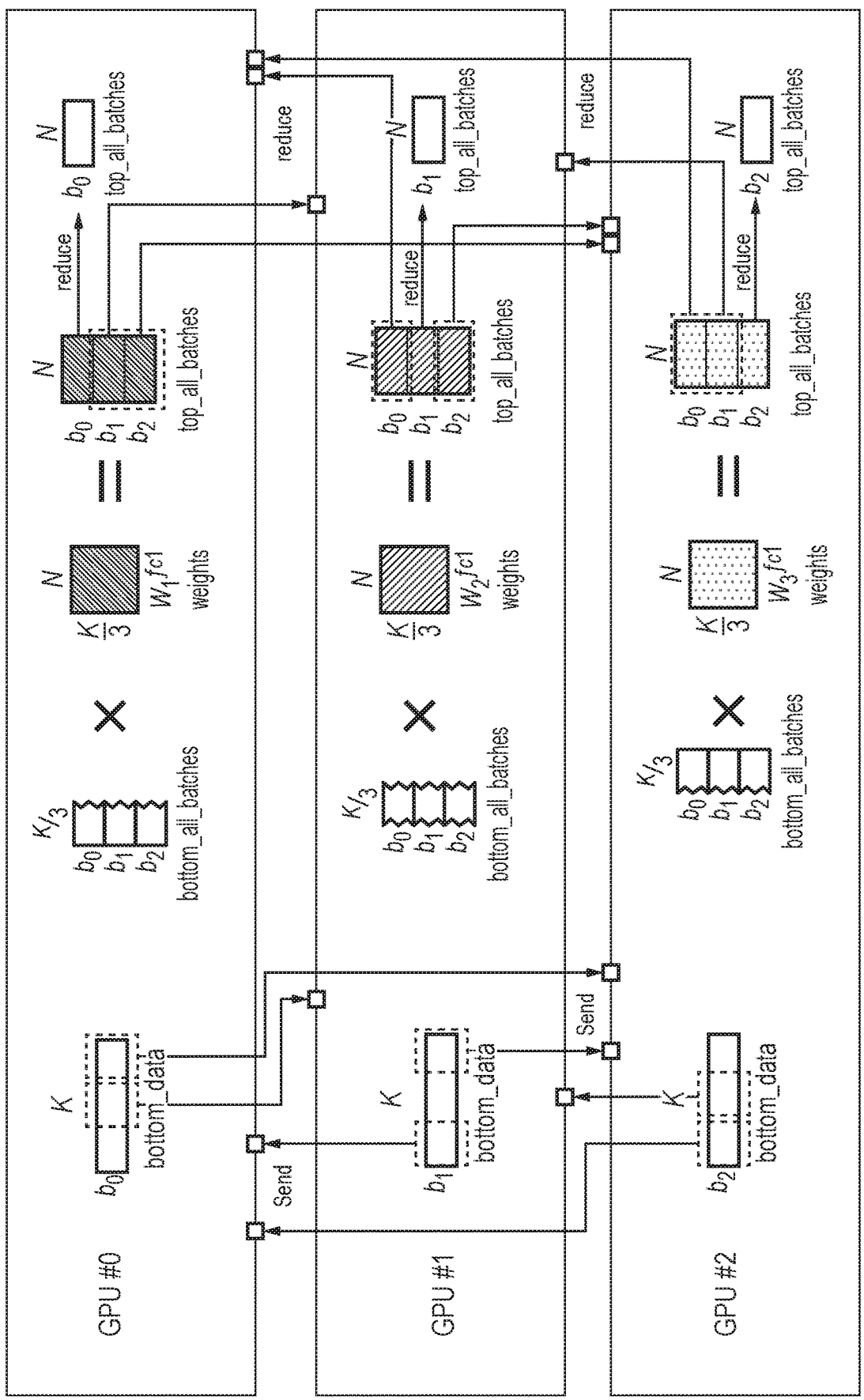
FIG. 2A is a schematic diagram of data and model parallelism across 3 GPUs in forward propagation of a DNN according to an embodiment.

A simplified data-flow corresponding to the forward propagation phase is shown in FIG. 2A.

FIG. 2A shows the same GPUs and mini-batch distribution between the GPUs (data parallelism) as FIG. 1, with the same weights of the DNN. The timing of communication is also broadly similar. However, the way that the mini-batches (data) are multiplied by the weights is more efficient. Instead of taking a different mini-batch at a time, each from a different GPU (b0 from GPU #0, b1 from GPU #1 and b2 from GPU #2), and calculating the output by performing a smaller and less efficient matrix-matrix multiplication, the approach of invention embodiments consists of firstly gathering the mini-batches from all the GPUs (batch integration) that are processing different replicas of the model (data parallelism) to then compute only one single matrix-matrix multiplication. This is more efficient from the perspective of how the GPU resources are exploited: better occupation of the GPU, and especially a multiplication between more squared matrices than the previous approach. With this strategy is possible to calculate the output for all mini-batches at the same time, which results in lower overall execution time, as there is only one efficient computation at the GPU, instead of as many as different model replicas (one per GPU—here 3).

Figure 2B:
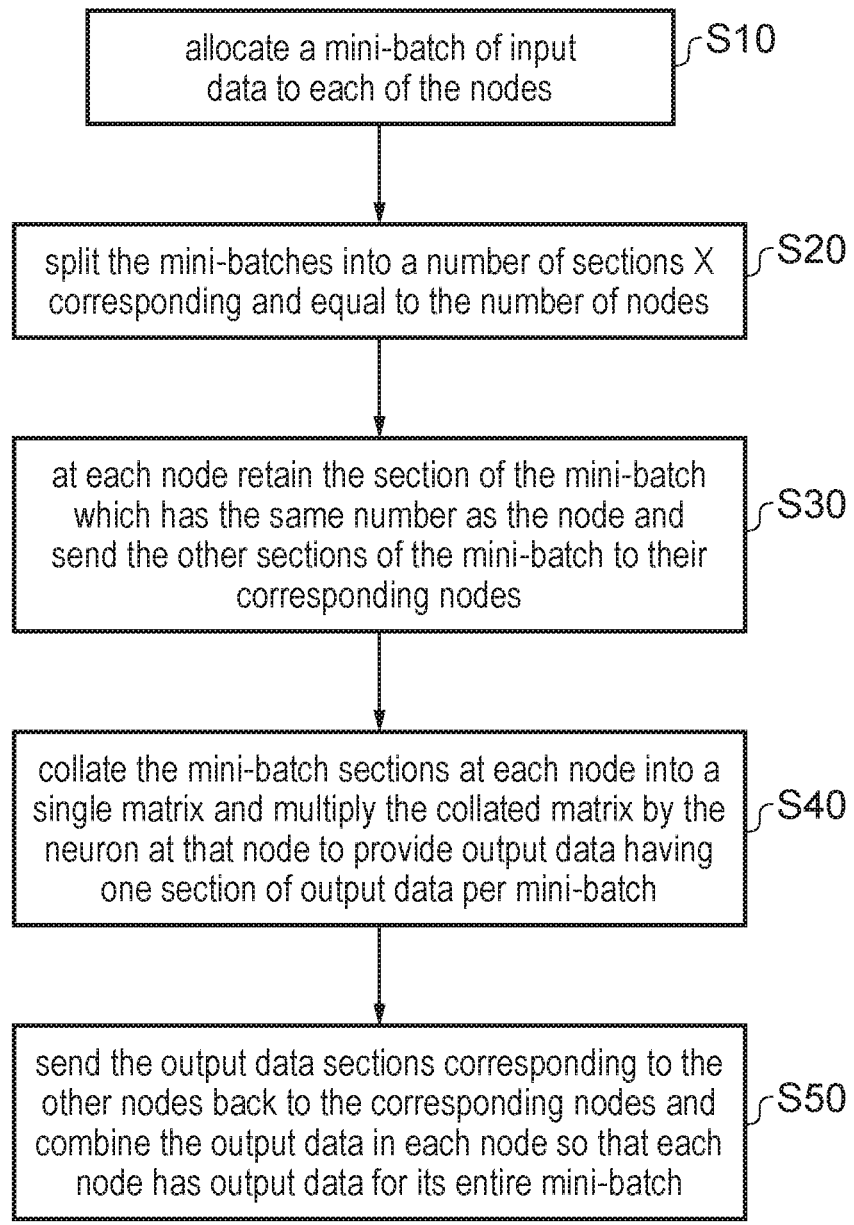
FIG. 2B is a flow chart of a method as illustrated in FIG. 2A, across X nodes.

FIG. 2B is a flow chart explaining the method over X nodes/GPUs. Step S10 allocates a mini-batch of input data (basically a lump of input data, whether after processing from a previous layer, in which case the K inputs may be one per neuron in the previous layer or initial input data, in which case K is the full initial input data size) to each of the nodes. S20 splits the mini-batches at each node into a number of sections X corresponding and equal to the number of nodes. Thus if there are 40 nodes 1 to 40, there are 40 sections 1 to 40 and section 3 corresponds to node 3 etc.

Step S30 takes place in each node. The node retains the section of the mini-batch which has the same number as the node and sends all the other sections of the mini-batch to their corresponding nodes.

Step S40 also takes place at each node and collates the mini-batch sections at that node into a single matrix, multiplying the single collated matrix by the neurons (the filter function(s)) at that node to provide output data having one section of output data per mini-batch.

Finally, step S50 at each node sends the output data sections corresponding to the other nodes back to the corresponding nodes and combining the output data in each node so that each node has output data for its entire mini-batch.

From the perspective of a single layer execution at one GPU, FIG. 3 shows, in a simplified manner, the difference between the Krizhevsky approach mentioned above and the data-model approach of invention embodiments (hereinafter, the data-model approach).

Figure 3A:
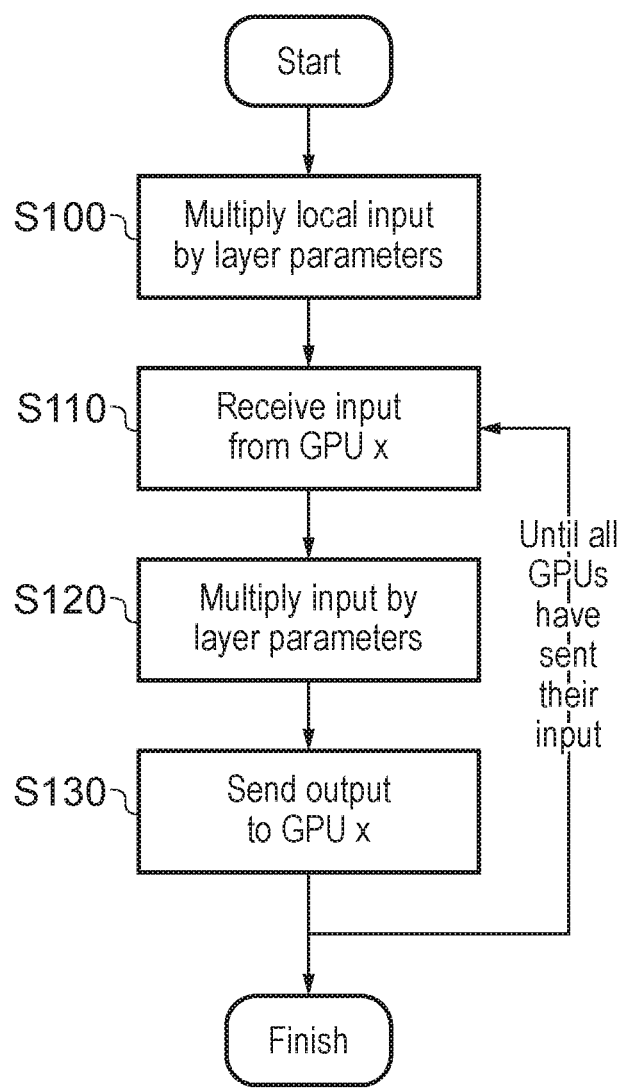
FIG. 3A is a flow chart of a prior art method.

FIG. 3A shows the Krizhevsky approach. In S100, the GPU multiplies its local input by the layer parameters. In S110 (which may be in parallel, or before or after S100) the GPU receives input from another GPU, exemplified as GPUx. In S120 the GPU multiplies this received input by the layer parameters, in S130 the GPU sends the output back to GPUx. Steps S110 to S130 are repeated until all GPUs have sent their input.

Figure 3B:
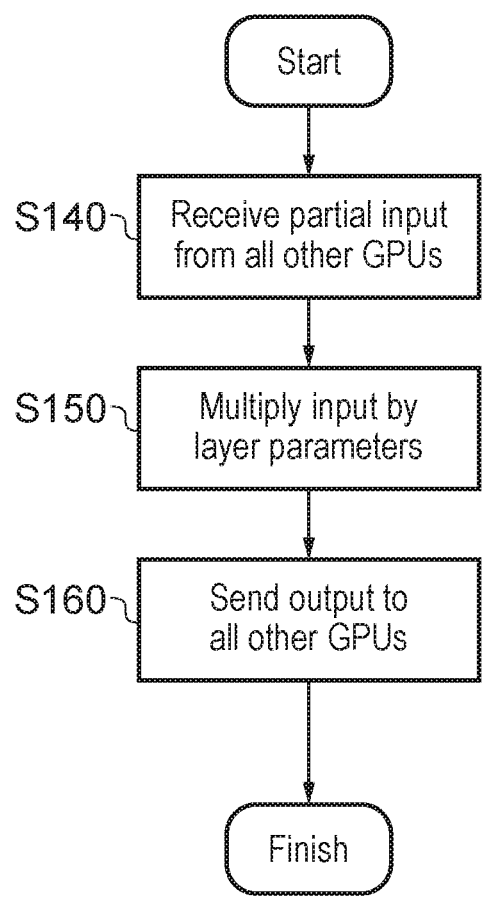
FIG. 3B is a flow chart of a data-model method

FIG. 3B shows the approach of invention embodiments. In S140, the GPU receives the partial inputs from all the other GPUs. In S150 it multiplies the combined input by the layer parameters, in S160 it sends the output to all the other GPUs as explained for FIG. 2.

Figures 4A, 4B:
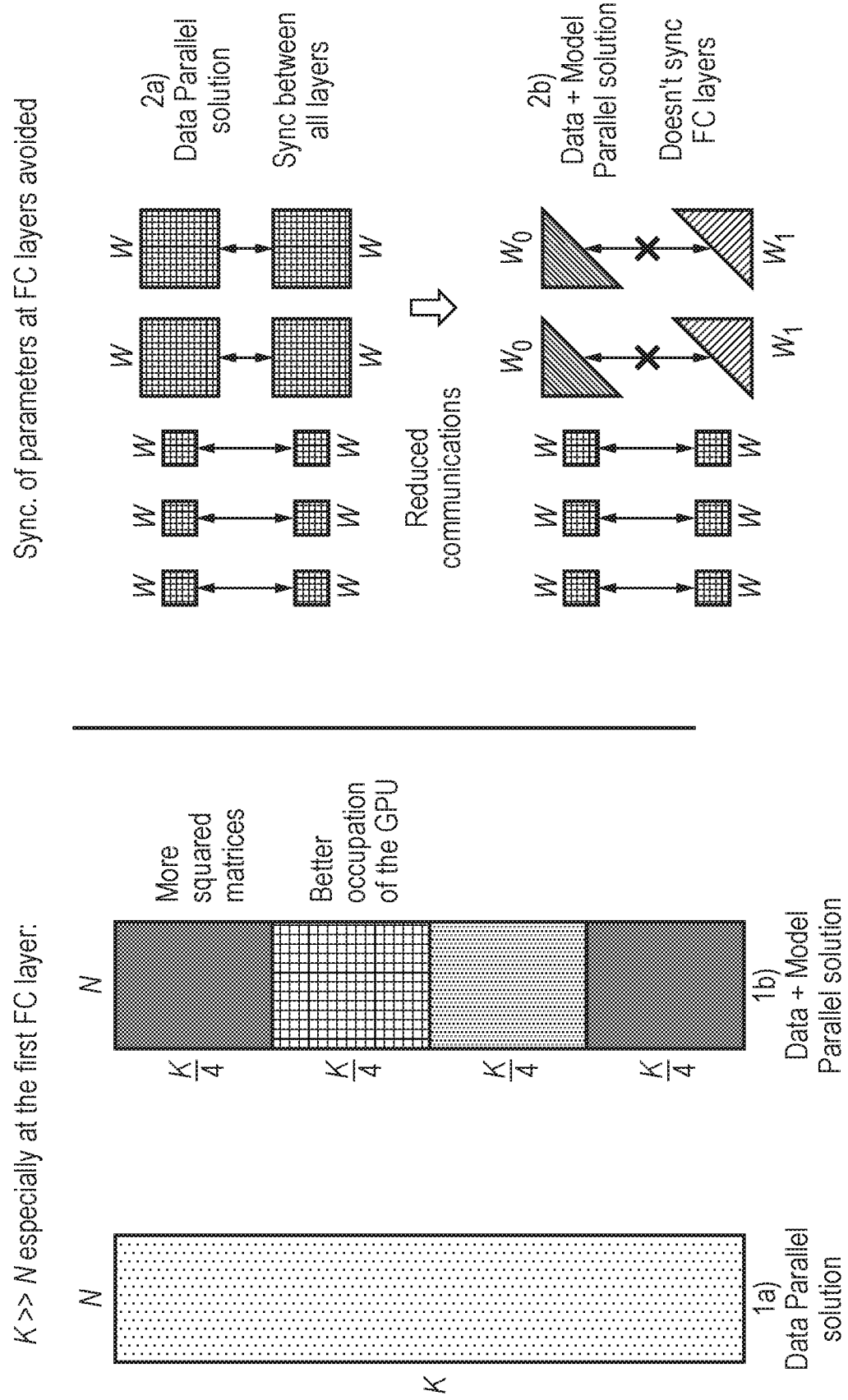
FIGS. 4A-4B are schematic diagrams demonstrating the benefits of combining data and model parallelism.

The addition of this model parallelisation technique to traditional data-only parallelisation approaches, which are implemented by most of the state-of-the-art DNN frameworks, brings two main improvements, as shown schematically in FIGS. 4A-4B. FIG. 4A represents, on the left, the matrix multiplication of the prior art, and on the right, the matrix multiplication of the data-model approach. The illustration is for 4 GPUs and the number of neurons in the previous layer K is much larger than the number of neurons in the current layer N. This is especially true at the first Fully Connected FC layer. In the data parallel solution (1a), the full K is multiplied by the full model in this layer N. In the data and model parallelism approach of invention embodiments (1b), the previous results are divided into 4, each K/4 of which is multiplied by the model N. In the representation of the synchronisation of parameters at FC layers shown in FIG. 4B, for the data parallel solution the communication of weights requires synchronisation between all layers (2a). In contrast, the embodiments do not synchronise the FC layers.

The model parallelisation approach of embodiments allows a better occupation of the GPU, with more squared matrices (1b) than data parallelism only (1a), while saving memory in the process. Additionally, synchronisation of parameters between different replicas of the model (2a) is avoided as the model is already distributed at the fully connected layers (2b).

FIGS. 5A and 5B shows the difference between the typical execution flow of a fully connected layer in a DNN (FIG. 5a), as opposed to the data-model approach of embodiments (FIG. 5b).

In FIG. 5A, the process retrieves the parameters' GPU address in S200 from private parameter addresses. In S210, the input is multiplied by the parameters. In S220 the bias is summed to the output (bias is used in DNN to make sure that a 0 output from any node can produce a non-zero output in the next layer).

In FIG. 5B, the execution of the fully connected layer branches into different paths depending on the phase. In the training phase, first in S230, the private addresses of the parameters at the GPUs corresponding to that particular layer are read. Then, all inputs from different GPUs are gathered in S240 (batch integration) before performing the actual multiplication with the layer's parameters, which is done only once in S250 (more details in FIG. 7). Finally, in S260 and S270, the output from each layer is sent to the rest of the GPUs in order to compute the final output of the layer at each GPU, which is equivalent to those outputs in the data-only parallel case.

The validation or test phase is performed in a different way. In step S280, new threads are created and then in S290 a new thread is assigned to a GPU. In S300 the GPU memory address is retrieved from global memory addresses. In S310, there is broadcast input from the main GPU and in S320 the input is multiplied by parameters. In S330 the output from other GPUs is reduced. In S340 the bias is summed to the output and then all threads are joined at S350.

The reasoning behind this process is as follows. State-of-the-art frameworks, implementing data-only parallelism, such as Caffe, use only a single GPU to perform the iteration of the test phase, as each GPU holds a complete replica of the model. In the data-model approach of invention embodiments, the model is only replicated at certain layers, while the fully connected layers are split among different GPUs. As a result, there is only one thread (typically the root solver), assigned to a particular GPU, executing the test iteration in those layers which are replicated. When this thread reaches the part of the model which is split, it needs to access the layer parameters from other GPUs, as they are all partitions of the same model.

The data-model approach tackles this issue by dynamically creating and destroying new threads when necessary at the fully connected layers. As the thread responsible for executing the test iteration (typically called the root solver) reaches a fully connected layer, the thread creates additional threads, one per different GPU/mini-batch (S280). Each of these new threads is assigned to a specific GPU (S290). Each GPU holds the set of parameters corresponding to a different partition (at training phase) For example, as shown in FIG. 2, GPU #0 holds one third of the model. However, since memory addresses are usually private to the thread and GPU, the new threads are not able to access such parameters. To solve this problem, during the set-up of the layer, these addresses have to be made global and stored in a shared data structure which is initialialised by the solver, and filled during the set-up of the layers of the DNN. These memory addresses are then accessed during the test phase by the new threads.

The next step consists of broadcasting the input from the main thread/GPU (root solver) to the rest of threads, so they can compute the output of the layer. Finally, as each GPU holds a different partition of the set of parameters of the layer, the result of the matrix-matrix multiplication is reduced at the main thread, where the bias is added. Therefore, the output of the layer is also equivalent to the one resulting from a data-only parallel solution. The last step involves the destruction of the new threads.

Figure 6:
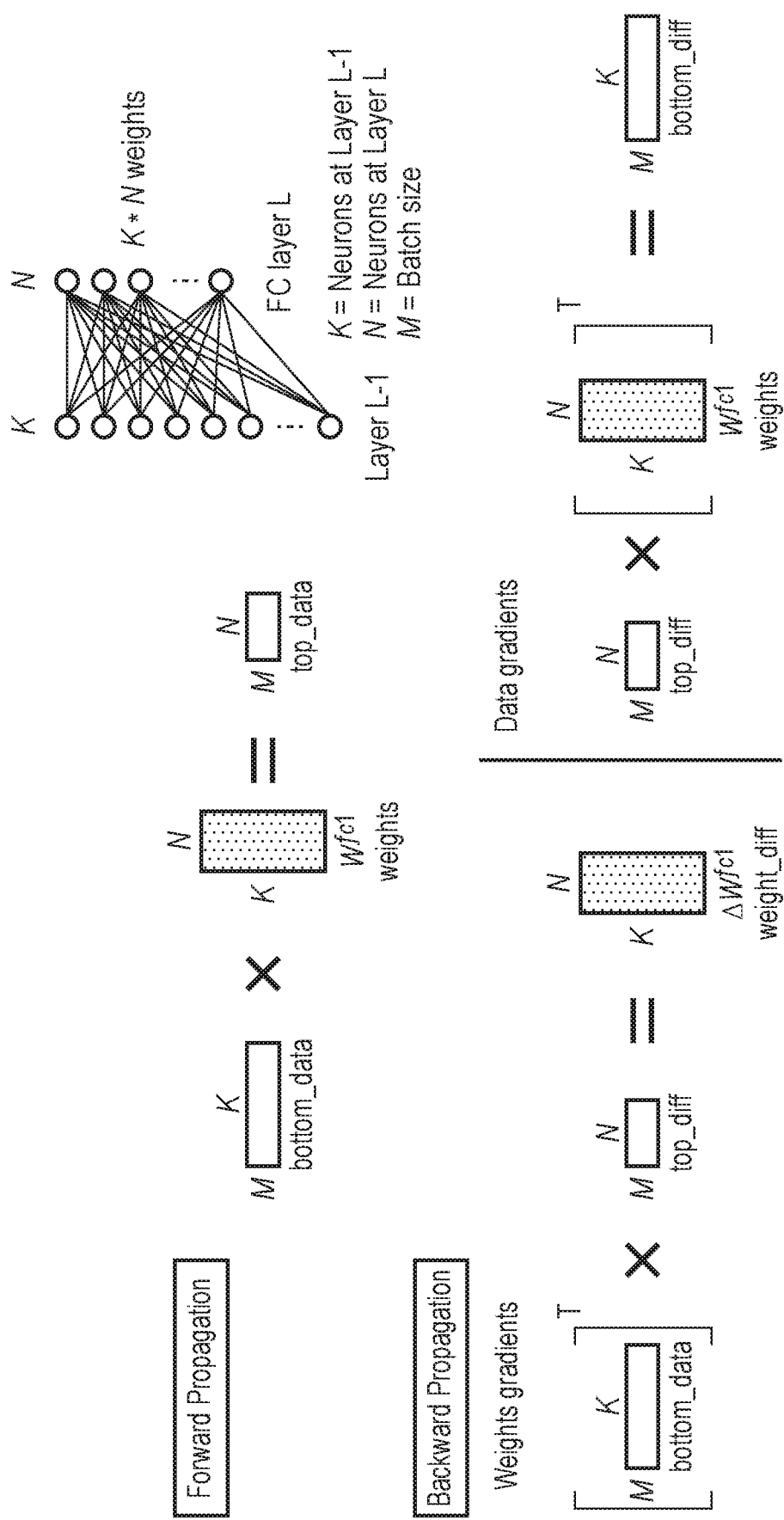
FIG. 6 is an example of traditional forward and backward propagation at the fully connected (FC) layers in a data-only parallel solution.

FIG. 6 shows the operations involved in a data-only parallel solution, to compute the output of a fully connected layer (FC layer L) at forward propagation, and the parameters and data gradients at the backward propagation. In forward propagation, the M by K bottom data from Layer L-1 is multiplied by the K by N weights (i.e. the full model) to produce M by N top data (where M is the mini-batch size). The results of penultimate Layer L-1 are crossfed in FC layer L so that each of the K neuron results at L-1 are multiplied and fed to each of N neurons at L.

In backward propagation, the weights gradients matrix, which is a transposed version of the bottom-data matrix in forward propagation, is multiplied by the data gradients to give weight gradients, whereas the data gradient are multiplied by the transposed weight gradient matrix.

Figure 7:
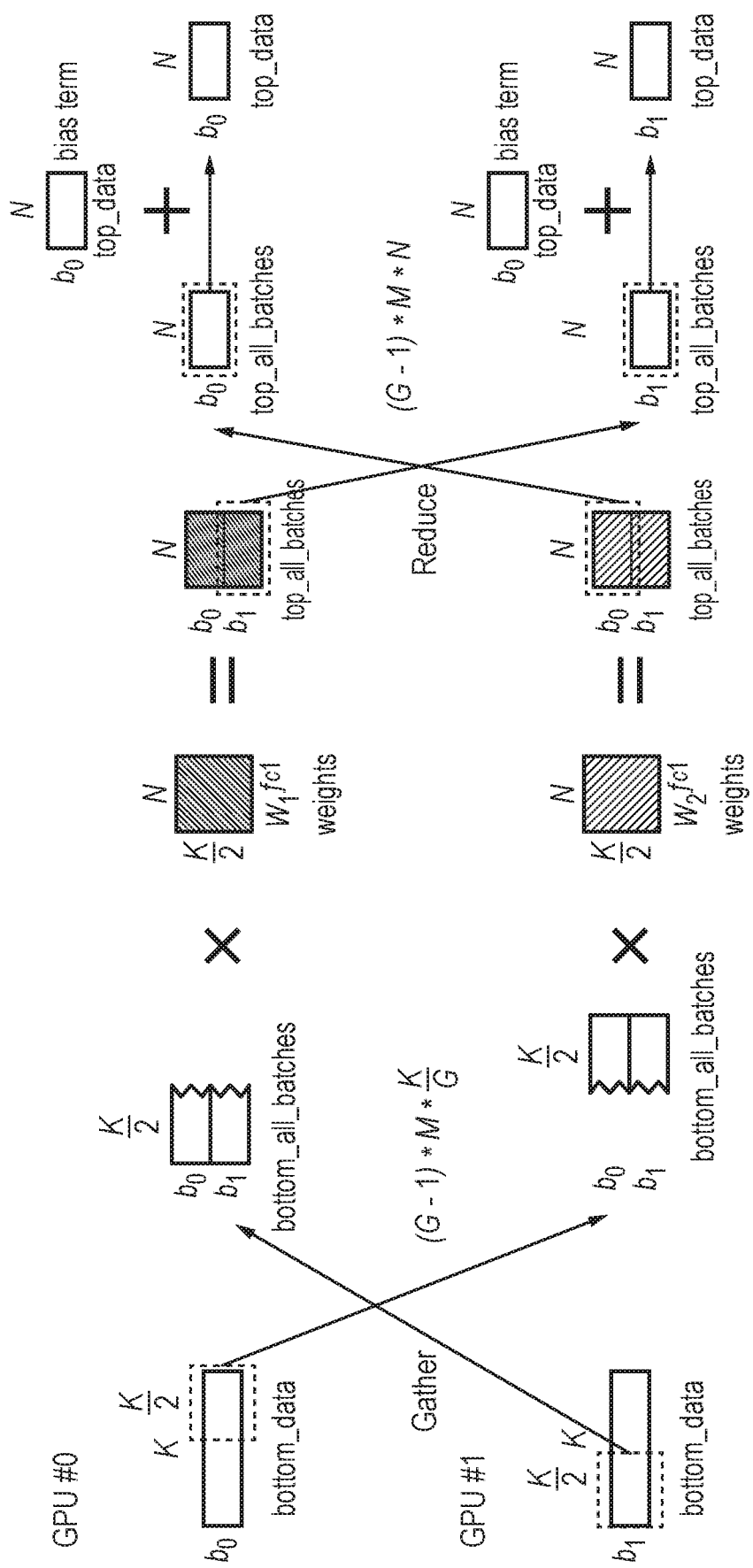
FIG. 7 is a schematic diagram illustrating forward propagation in a training phase of the data-model approach.

The way these operations are carried out by the data-model approach of invention embodiments is different, as shown in FIG. 7, which describes in more detail the mathematical operations mentioned in previous FIG. 5 for a 2-GPU setting during forward propagation. FIG. 7 follows the same format as FIG. 2, but with two GPUs and thus a division of each data batch into 2 mini-batches, b0 allocated to GPU #0 and b1 allocated to GPU #1.

Both GPUs send a section of their input for processing by the other GPU (each GPU is actually processing a different mini-batch) to the other one. Then, these inputs are collated and multiplied at each GPU by the subset of parameters that are allocated at each GPU, following the logic described in FIG. 7. Thus, GPU #0 processes the first sections of the mini-batches b0 and b1and GPU #1 processes the second sections of these mini-batches. The outputs of these multiplications are an intermediate result of the final output of the layer at each GPU. Therefore, each GPU sends the part of the resulting matrix that corresponds to the mini-batch to be processed by the other GPU back to that GPU. Then, each GPU combines the matrix corresponding to its re-combined mini-batch, and finally, it adds up the bias term in order to produce the final output of the layer at that GPU.

Figure 8:
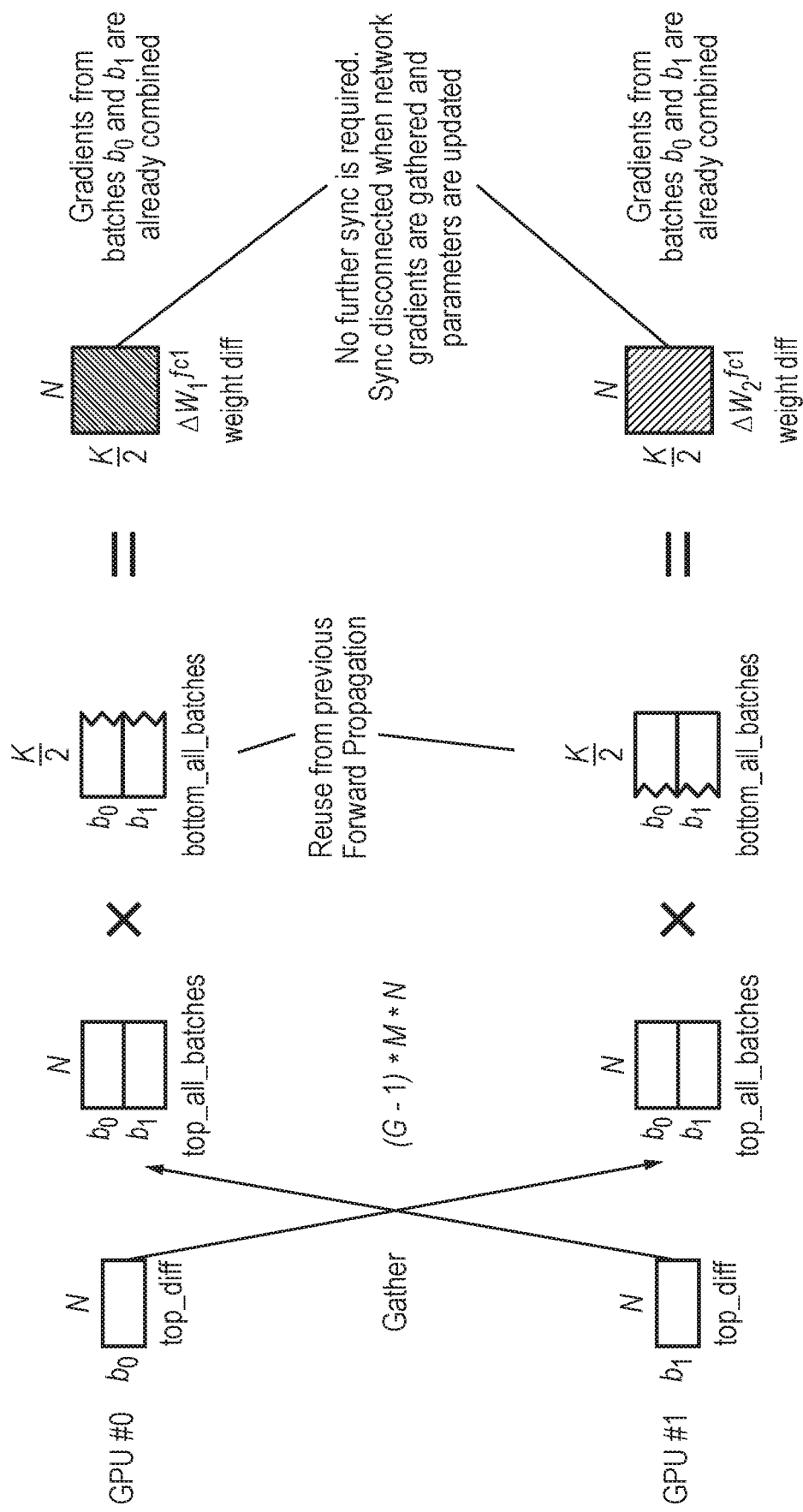
FIG. 8 is a schematic diagram of backward propagation to calculate the parameters (weights) gradients of the data-model approach.

FIG. 8 describes the mathematical operations involved during backwards propagation of a DNN in the data-model approach, in the same 2-GPU setting. Each GPU receives as input the corresponding data gradients to each mini-batch from the previous layer. These input data gradients are then sent to the other GPU, which will re-use the space used for the outputs during forward propagation to store the gathered inputs. These inputs are then multiplied by the gathered data inputs (the sections of b0 and b1 multiplied by the GPU in question) from the forward propagation to generate the parameter gradients. Since parameters of a layer are already distributed among different GPUs, the corresponding gradients do not need to be interchanged and synchronised, avoiding a significant amount of communication: gradients from b0 and b1 are already combined.

Figure 9:
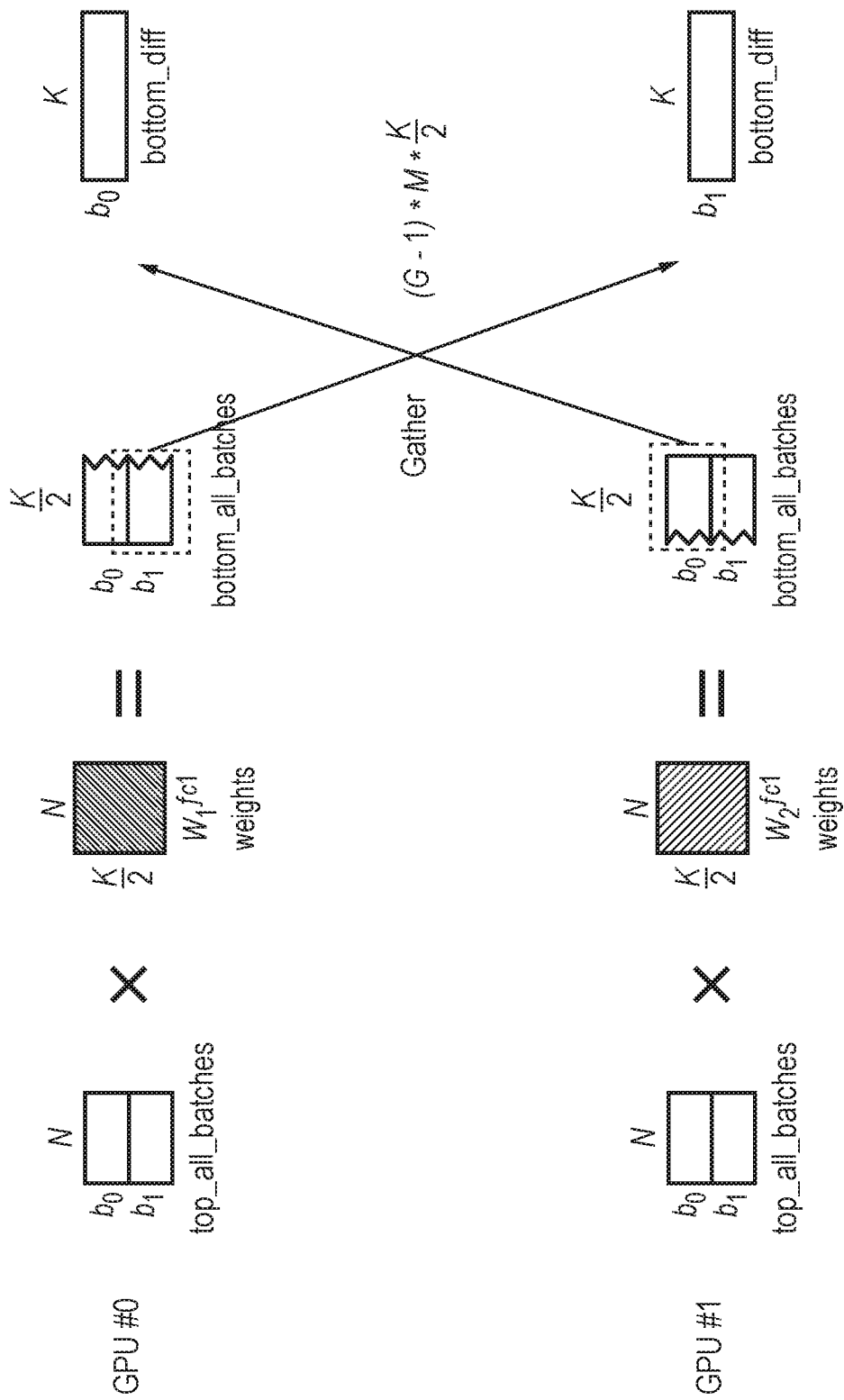
FIG. 9 is a schematic diagram of backward propagation to calculate the data gradients of the data-model approach.

FIG. 9 shows backward propagation to calculate the data gradients of the proposed data-model approach. FIG. 9 thus describes a similar process to FIG. 8 in the same setting during backward propagation and for the data-model approach, but with the aim of computing the output data gradients of the layer for the next one in the pipeline. In a similar fashion to what has been described before, each GPU multiplies each subset of network parameters by the input data gradients already gathered at the previous step (FIG. 8). The result of this operation at each GPU is a sub-part of the output data gradients for the layer. In the example described in the figure, the first GPU #0 holds the left part of all the matrices that represent the output data gradients, while the second GPU #1 holds the right part. In a setting with more GPUs, each GPU would hold a different section of the final matrix, from left to right. Therefore, each GPU sends the sub-part which does not correspond to its mini-batch, and receives the part that does correspond to its mini-batch. Finally, at each GPU, these sub-parts are combined.

The data-model approach avoids modifying the traditional process flow to compute the bias and bias gradients, in forward and backward propagation respectively. The approach allows this by dividing the parameters of the layer and thus splitting the input dimension of the layer.

As the calculation of the bias only depends on the output dimension of the layer (one bias parameter per output of the layer), there is no need to introduce additional communications.

In the data parallel implementation, the parameters' synchronisation, before their update, happens among all gradients at each GPU. In the data-model approach, this synchronisation is avoided at the fully connected layers, since these are already split, and hence, these are not replicas of the same model trained with different data.

FIG. 10 describes the differences between a data-only approach and the data-model approach to synchronisation of the DNN parameters after each iteration, and how the synchronisation process is actually changed.

The upper half of the figure shows a data parallelism (data-only) approach in which there is synchronisation of gradients in each layer. The lower half of the figure shoes the data-model approach for the same process.

Traditional frameworks follow mainly two methods to synchronise the parameters:

(1) Keep a pointer to each different layer, and synchronise each layer iteratively; or (2) Keep all the DNN parameters in a data structure contiguous in memory, and synchronize them in bulk in one go.

In the first method, the data-model approach only needs to omit the parameters, but not the biases, for each distributed layer in the iterative process. On the contrary, in the second method, the data-model approach processes the contiguous data structure once it is set up in memory (before the training process), artificially dividing it to omit the parameters of the distributed layers while minimising the number of sections. This division is not actually made in the data structure itself, but by keeping an auxiliary data structure with the pointer to the beginning to each subsection, together with its length.

Figure 11:
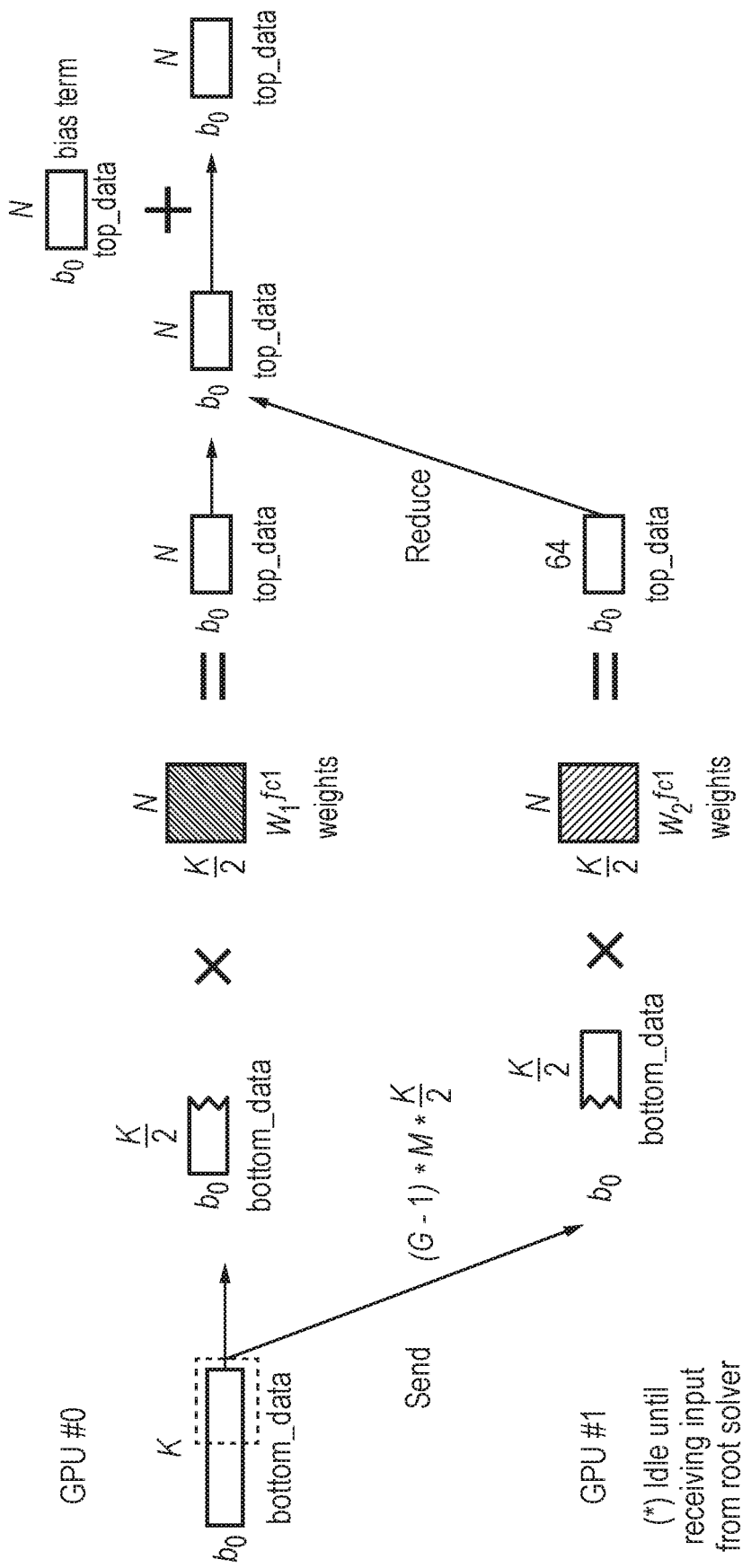
FIG. 11 is a schematic diagram of forward propagation in a test phase of the data-model approach.

Previous figures and description focused on the training phase of a DNN. However, the test phase needs to be handled in a different fashion. Typically, in a data-only approach, the test phase is only required to take place at one GPU, as it holds the whole replica of the DNN. In the data-model approach, the parameters of the network are distributed at certain layers, and therefore, the test phase needs to be also distributed at those distributed layers, as shown in FIG. 11. FIG. 11 shows forward propagation in the test phase of the proposed data-model approach. Here, in a 2-GPU setting as explained previously, the right section of input data is sent to GPU #1 for processing with the parameters at GPU #1 and then results are sent to GPU #0. The left section of input data is processed by GPU #0 and the two sections are re-united as top data and bias added to form final top data.

Implementation

A typical implementation of the embodiment would improve the use of the state-of-the-art collective communications for a GPU (NCCL-NVIDIA® Collective Communications Library™), which at the time of writing does not include a directive to gather the subparts and reorder them following the logic described above.

Figure 12:
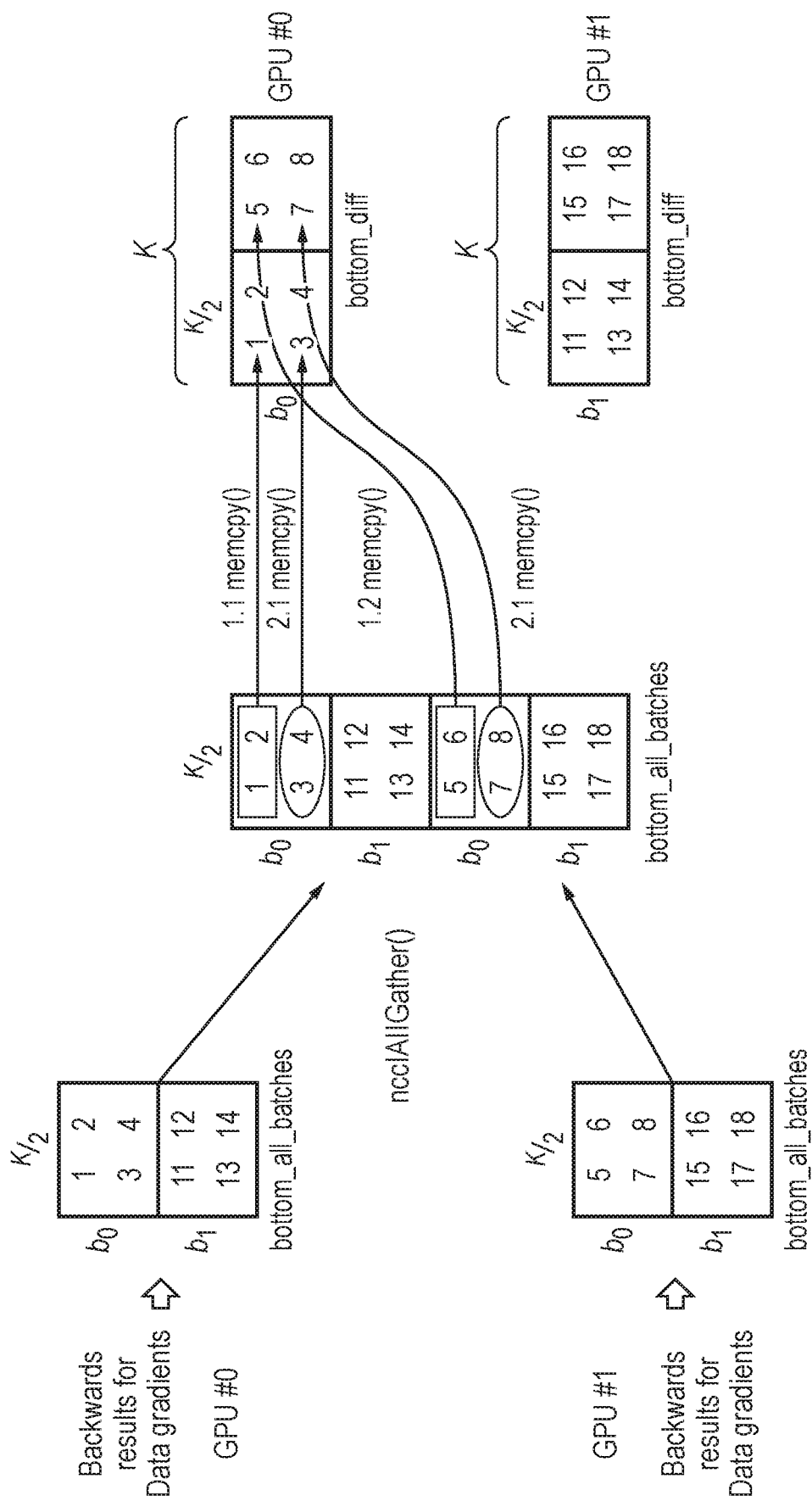
FIG. 12 is a schematic diagram of an algorithm to overcome NCCL limitations in the context of the data-model approach.

As a result, the data-model approach offers an algorithm to solve this problem, while making the output data gradients of the layer during backward propagation consistent with the expected values. Such an algorithm is described by FIG. 12. FIG. 12 demonstrates a new algorithm to overcome NCCL limitations in the context of the data-model approach. The data (in the form of backwards results for data gradients) is divided between two GPUs as before. The first half K/2 of b0 is at GPU #0 and the second half K/2 of b0 is at GPU #1. NCCL gathers data patches from the GPUs and collates them one after the other, so that the first section of b0 K/2 is processed with the first section of b1 K/2 and the same for the second sections. Later, when the GPU needs to produce the output data gradient for its corresponding mini-batch, it reconstructs the output by copying the corresponding rows in the appropriate order to the output data gradient.

Moreover, NCCL, as a collective communications library does not allow for point to point communications, which are necessary to make a more efficient implementation. Therefore, additional memory is required to receive the whole of the input from other GPUs, corresponding to other mini-batches. As a consequence, not all of the data received is actually used in the matrix-matrix multiplication, which implies a need to be clever with the leading dimensions and the offsets when making use of the underlying linear algebra library which actually implements the matrix-matrix multiplication. In this case, the library should be called in a way that the actual multiplication happens between a submatrix and a matrix, or vice-versa, depending on the case.

Once these limitations are overcome, the data-model approach may be implemented by modifying a DNN framework, such as Caffe, by changing the whole logic of the layers that are distributed, following the processes described in the previous section.

The data-model approach is applicable to different fields, depending on the final computational needs of the target application of the training process. The data-model approach is especially beneficial when processing networks with a significantly large number of parameters, such as medical applications, which usually demand that the image has a high resolution in order to not miss any fine detail that may affect the diagnosis. Such high resolution images significantly increase the number of parameters of the DNN, especially in the connection of the last convolutional layer and the first fully connected layer, where the density of connections is particularly high. The implementation of the data-model approach in these conditions leads to acceleration of the training process, while reducing the memory consumption of the GPUs or other accelerators involved.

Hardware Implementation

Figure 13:
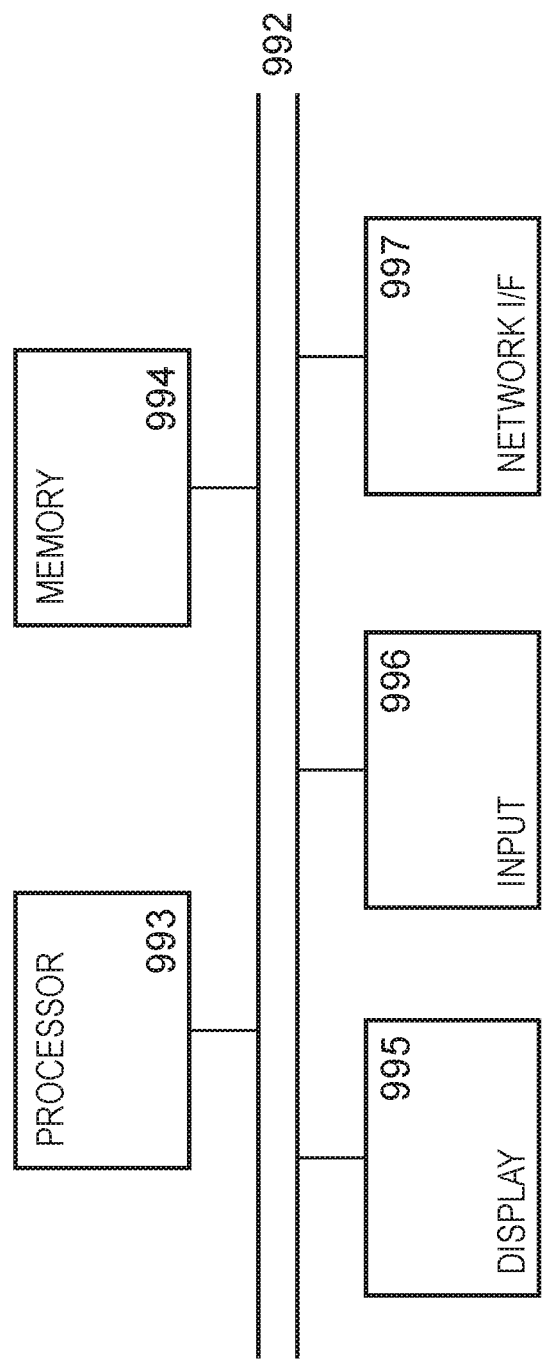
FIG. 13 is a diagram of suitable hardware for implementation of invention embodiments.

FIG. 13 is a block diagram of a computing device, such as an accelerator/node/GPU, which embodies the present invention, and which may be used to implement a method of training a CNN. The computing device comprises a processor 993, and memory, 994. Optionally, the computing device also includes a network interface 997 for communication with other computing devices, for example with other computing devices of invention embodiments.

For example, an embodiment may be composed of a network of such computing devices, each being a GPU. Optionally, the computing device also includes one or more input mechanisms such as keyboard and mouse 996, and a display unit such as one or more monitors 995. The components are connectable to one another via a bus 992.

The memory 994 may include a computer readable medium, which term may refer to a single medium or multiple media (e.g., a centralized or distributed database and/or associated caches and servers) configured to carry computer-executable instructions or have data structures stored thereon. Computer-executable instructions may include, for example, instructions and data accessible by and causing a general purpose computer, special purpose computer, or special purpose processing device (e.g., one or more processors) to perform one or more functions or operations. Thus, the term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media. By way of example, and not limitation, such computer-readable media may include non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices).

The processor 993 is configured to control the computing device and execute processing operations, for example executing code stored in the memory to implement the various different functions described here and in the claims to train a CNN. The memory 994 stores data being read and written by the processor 993. As referred to herein, a processor may include one or more general-purpose processing devices such as a microprocessor, central processing unit, or the like. The processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor may also include one or more special-purpose processing devices such as an application specific integrated circuit (ASIC), a field programmable gate array (FPGA), a digital signal processor (DSP), network processor, or the like. In one or more embodiments, a processor is configured to execute instructions for performing the operations and steps discussed herein.

The optional display unit 997 may display a representation of data stored by the computing device and may also display a cursor and dialog boxes and screens enabling interaction between a user and the programs and data stored on the computing device. The optional input mechanisms 996 may enable a user to input data and instructions to the computing device.

The network interface (network I/F) 997 may be connected to a network, such as the Internet, and is connectable to other such computing devices via the network. The network I/F 997 may control data input/output from/to other apparatus via the network. Other peripheral devices such as microphone, speakers, printer, power supply unit, fan, case, scanner, trackerball etc. may be included in the computing device.

Methods embodying the present invention may be carried out on a network of computing devices such as that illustrated in FIG. 13, each device holding a portion of a model in the form of neurons and receiving input data in mini-batches. Such a computing device need not have every component illustrated in FIG. 13, and may be composed of a subset of those components. A method embodying the present invention may be carried out by a single computing device in communication with one or more data storage servers via a network.

Benefits

The data-model approach realises the combination of data and model parallelism for a DNN in a more efficient manner, accelerating the training of the DNN, while reducing the memory requirements thereof. These benefits are brought to the final users in a completely automatic and transparent manner, as they do not need to change the way they use the existing frameworks. Essentially, the final user just defines the same (non-distributed) network. The data-model approach takes care of the distribution of the parameters and the modified logic in the process of the distributed layers without user intervention, while producing the same expected results.

In practice, such a reduction in memory brings the possibility of training larger inputs, such as high resolution images, or even larger batch sizes. In terms of training performance, the approach also opens the possibility of processing more images per unit of time, or even larger input sizes while requiring less training time than smaller input sizes in data-only parallel approaches.

Embodiments may provide:

Methods that realise an efficient combination of data and model parallelism for DNNs, replacing smaller and ineffective kernels at the underlying GPUs and/or accelerators by one single kernel at each GPU/accelerator and distributed layer.

Methods that automatically perform an integration of multiple mini-batches in a data-model parallel setting, where the mini-batches are communicated before the distributed layers, and the outputs are rebuild appropriately at their end.

Methods that automatically perform the distributed computation of the fully connected layers of a DNN without requiring user intervention nor affecting the execution of the rest of the non-distributed part of the network (data-only parallel).

Methods that perform the different phases of the training (forward and backward propagation) and validation of a neural network in a distributed manner at the distributed layers (fully connected layers)

Methods that seamlessly and transparently split the execution flow of a fully connected layer depending on the phase the network is: training or test phase. In the training phase, the method makes use of the existing threads and GPUs to carry the distributed computation of the layer for each mini-batch at once. In the test phase, the method creates additional threads, reusing the memory allocated at other GPUs by the training threads. The final result in both cases is equivalent to an execution of the layer is non-distributed fashion.

The invention claimed is:

1. A computer-implemented method comprising:
   in a computing network comprising a number of nodes 1 to X having processors and memory, dividing neurons of a Convolutional Neural Network (CNN) between the number of nodes;
   allocating a mini-batch of input data from among mini-batches of input data to a node of the number of nodes;
   splitting for the node, from among the number of nodes, the mini-batch into a number of mini-batch sections X corresponding and equal to the number of nodes;
   at the node retaining a mini-batch section from among the split mini-batch sections which has a same number as the node and sending other mini-batch sections of the split mini-batch sections to corresponding other nodes according to a number of the split mini-batch sections;
   collating at the node the split mini-batch sections at the node into a single matrix and multiplying the collated matrix by the neurons to provide output data sections having one section of output data per each mini-batch section of the split mini-batch sections;
   at the node sending the output data sections corresponding to the other corresponding nodes to the corresponding nodes and combining the output data sections in the node so that the node has output data for entire of the split mini-batch sections.

2. The method according to claim 1, wherein the method is used in a forward propagation phase in a fully connected layer of the CNN, for training the CNN.

3. The method according to claim 1, wherein each node includes a memory and processing capability, including processing capability as an accelerator in a graphics processing unit (GPU).

4. The method according to claim 1, further comprising: adding a bias term to the combined output data sections.

5. The method according to claim 1, further comprising, in a forward propagation of a test phase at a fully connected layer:
   creating new threads from a root solver thread at a main node, from among the number of nodes, executing a test iteration, each created new thread assigned to a different node, from among the number of nodes, the created new threads accessing memory addresses of neuron parameters held at the different nodes.

6. The method according to claim 5, further comprising: the main node broadcasting input data for the test phase to the created new threads, and the created new threads computing an output of the a fully connected layer before all the created new threads are joined.

7. The method according to claim 5, wherein, in a backward propagation phase at a convolutional layer,
   each node receives input data gradients for the allocated mini-batch and sends the input data gradients to each node where a mini-batch section of the allocated mini-batch was processed; and
   each node multiplies the input data gradients at each node with the collated split mini-batch sections from the forward propagation phase to produce parameter gradients at each node from all the split mini-batch sections.

8. The method according to claim 7, wherein the input data gradients are stored at each node in a memory space used for the output data for the entire split mini-batch sections.

9. The method according to claim 7, further comprising using backward propagation to calculate data gradients, wherein
   each node multiples the output data for the entire split mini-batch sections by the parameter gradients to provide output data gradients; and
   the output data gradients corresponding to the other corresponding nodes are sent to the corresponding nodes so that each node holds the output data gradients for the entire mini-split batch sections.

10. The method according to claim 9, wherein the bias term is only synchronized at the fully connected layer before the neuron parameters are updated.

11. The method according to claim 1, wherein the CNN is a Deep Neural Network, DNN.

12. An apparatus to communicationally couple to a number of processing nodes 1 to X to carry out a training procedure of a Convolutional Neural Network (CNN), the apparatus comprising:
   a processor; and
   a memory having instructions stored thereon, the instructions when executed by the apparatus implementing a node among the number of nodes, causing the node to control operations including,
      dividing neurons of the CNN between the number of nodes;
      allocating a mini-batch of input data from among mini-batches of input data to a node of the number of nodes;
      splitting from among the number of nodes, the mini-batch into a number of mini-batch sections X corresponding and equal to the number of nodes;
      retaining a mini-batch section from among the split mini-batch sections which has a same number as the node and sending other mini-batch sections of the split mini-batch sections to corresponding other nodes according to a number of the split mini-batch sections;
      collating the split mini-batch sections at the node into a single matrix and multiplying the collated matrix by the neurons to provide output data sections having one section of output data per each mini-batch section of the split mini-batch sections; and
      sending the output data sections corresponding to the other corresponding nodes to the corresponding nodes and combining the output data sections in the node so that the node has output data for entire of the split mini-batch sections.

13. A non-transitory computer-readable storage means storing a computer program which when executed by a number of processing nodes 1 to X, causes the number of processing nodes to perform operations comprising:

dividing neurons of a Convolutional Neural Network (CNN) between processing nodes;

allocating a mini-batch of input data from among mini-batches of input data to a node of the number of nodes;

splitting for the node, from among the number of nodes, the mini-batch into a number of mini-batch sections X corresponding and equal to the number of nodes;

at the node retaining a mini-batch section from among the split mini-batch sections which has a same number as the node and sending other mini-batch sections of the split mini-batch sections to corresponding other nodes according to a number of the split mini-batch sections;

collating at the node the split mini-batch sections at the node into a single matrix and multiplying the collated matrix by the neurons to provide output data sections having one section of output data per each mini-batch section of the split mini-batch sections;

at the node sending the output data sections corresponding to the other corresponding nodes to the corresponding nodes and combining the output data sections in the node so that the node has output data for entire of the split mini-batch sections.

\* \* \* \* \*